US012690721B2

(12) United States Patent
Klee

(10) Patent No.: US 12,690,721 B2
(45) Date of Patent: Jul. 28, 2026

(54) COOKING IMPLEMENT

(71) Applicant: Wade Everett Klee, Chilliwack (CA)

(72) Inventor: Wade Everett Klee, Chilliwack (CA)

( * ) Notice: Subject to any disclaimer, the term of this patent is extended or adjusted under 35 U.S.C. 154(b) by 960 days.

(21) Appl. No.: 17/931,380

(22) Filed: Sep. 12, 2022

(65) Prior Publication Data

US 2024/0081584 A1 Mar. 14, 2024

(51) Int. Cl.
*A47J 43/18* (2006.01)
*A47J 37/07* (2006.01)

(52) U.S. Cl.
CPC ........... *A47J 43/18* (2013.01); *A47J 37/0786* (2013.01)

(58) Field of Classification Search
CPC ....... A47J 43/283; A47J 43/18; A47J 37/0786
USPC ......... 99/352, 353, 354, 355, 374, 375, 380, 99/381, 382, 383, 400, 401, 419, 422, 99/441, 444, 446, 473, 481, 482, 421 A, 99/421 R, 421 H
See application file for complete search history.

(56) References Cited

U.S. PATENT DOCUMENTS

2015/0101493 A1* 4/2015 Prieto Dominguez ......................
                A47J 37/041
                99/421 H
2015/0223636 A1* 8/2015 Brouwer ............... A47J 43/283
                99/340

* cited by examiner

*Primary Examiner* — Phuong T Nguyen

(57) ABSTRACT

A hand held cooking implement that is configured to facilitate cooking of a food item over an open flame cooking source. The present invention includes main support member that is rod shaped having a first end and a second end. Operably coupled to the main support member are a first bracket and a second bracket wherein the first bracket is proximate the first end of the main support member and the second bracket is proximate the second end thereof. A rotational cooking member is movably mounted to the first and second bracket and is axially aligned with the main support member having a void therebetween. The rotational cooking member includes prong members contiguously formed therewith at the second end of the rotational cooking member. A burn guard member is integrally formed on the second end of the main support member and is adjacent to the prong members.

6 Claims, 2 Drawing Sheets

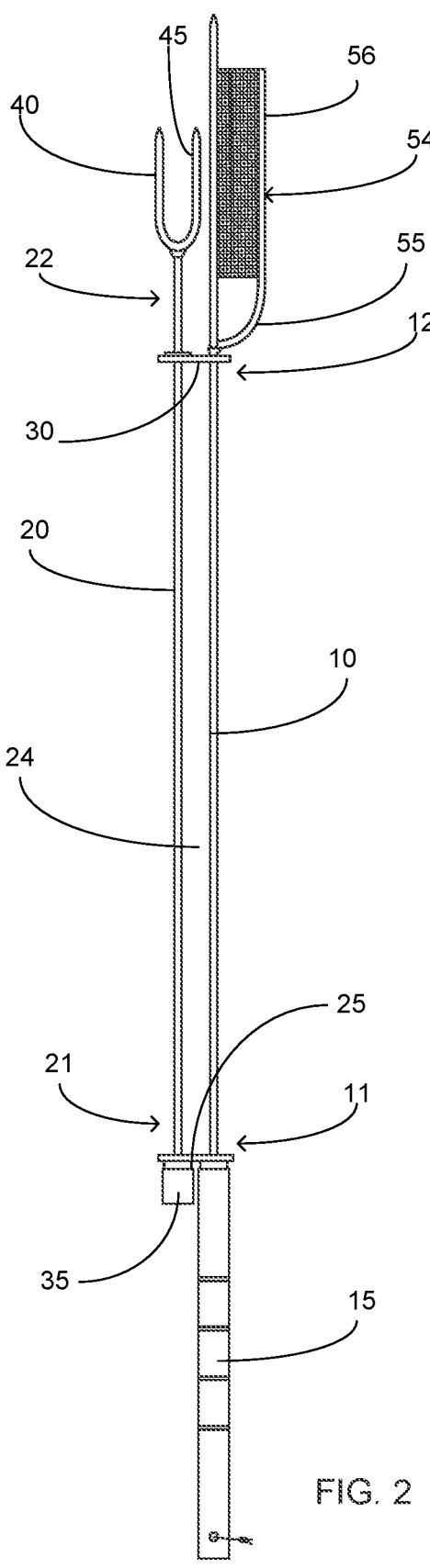
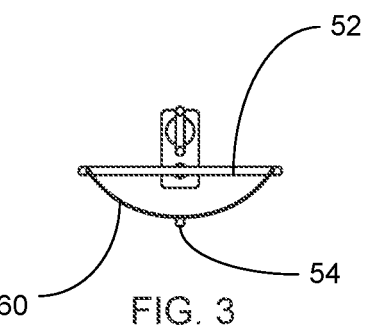
FIG. 2
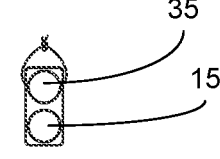
FIG. 3
FIG. 4

COOKING IMPLEMENT

FIELD OF THE INVENTION

The present invention relates generally to cooking implement, more specifically but not by way of limitation, a cooking apparatus that is configured to facilitate cooking of various food products over an open flame cooking source such as but not limited to a campfire wherein the present invention includes a rotational cooking member and a burn prevention member.

BACKGROUND

Millions of people regularly cook utilizing an open flame source such as but not limited to a wood fire. Wood fire open flame cooking is performed in professional establishments, homes and in certain recreational activities such as but not limited to camping. Most food items that need to be cooked can be cooked utilizing an open flame source such as but not limited to a fire. When cooking with open fire there are common implements that are employed to facilitate the cooking of the desired food product. For many food items implements such as but not limited to grates are deployed over the fire and are utilized to place the food item near the flame source in order to facilitate the desired cooking of the food item. Other open flame cooking items include large rotisserie implements and other hand held implements Utilization of hand held cooking implements often includes the use of skewers or similar implements that are employed to facilitate the cooking of one food item. By way of example but not limitation, popular food items that are cooked with skewers of similar devices are hot dogs and marshmallows. These items are typically impaled onto the end of the skewer and the item is then placed over the open flame cooking source. While the conventional cooking implements are capable of executing the desired function of facilitating the cooking of the food item, there are deficiencies with the existing technology. For high sugar items such as marshmallows the open flame can easily burn the marshmallow and as such produce an undesired result. Conventional skewers have no manner in which to provide protection against burning. For other food items cooked on skewers in order to produce a desired result the use must rotate the skewer so as to rotate the food item over the open flame. While this movement can be achieved with conventional implements the execution thereof can still be cumbersome.

Accordingly, there is a need for a cooking implement configured to facilitate cooking of at least one food item over an open flame wherein the present invention provides rotational movement of the food item and further provides an element to inhibit burning of the food item.

SUMMARY OF THE INVENTION

It is the object of the present invention to provide a hand held cooking implement configured to assist a user cook a food item over an open flame cooking source wherein the present invention includes a main support member.

Another object of the present invention is to provide a cooking implement configured to be utilized to cook a food item over a fire wherein the main support member includes a first end and a second end having a handle secured to the first end.

A further object of the present invention is to provide a hand held cooking implement configured to assist a user cook a food item over an open flame cooking source wherein the present invention further includes a rotational cooking member operably coupled to the main support member.

Still another object of the present invention is to provide a cooking implement configured to be utilized to cook a food item over a fire wherein the rotational cooking member is axially aligned with the main support member having a void therebetween.

An additional object of the present invention is to provide a hand held cooking implement configured to assist a user cook a food item over an open flame cooking source wherein the main support member has secured to the second end thereof a burn guard member.

Yet a further object of the present invention is to provide a cooking implement configured to be utilized to cook a food item over a fire wherein the burn guard member has a screen member that is underneath the second end of the rotational cooking member.

Another object of the present invention is to provide a hand held cooking implement configured to assist a user cook a food item over an open flame cooking source wherein the second end of the rotational cooking member includes a first prong member and a second prong member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 2 is a side view of the present invention; and

FIG. 3 is a rear end view of the present invention; and

FIG. 4 is a front end view of the present invention.

DETAILED DESCRIPTION

Figure 1:
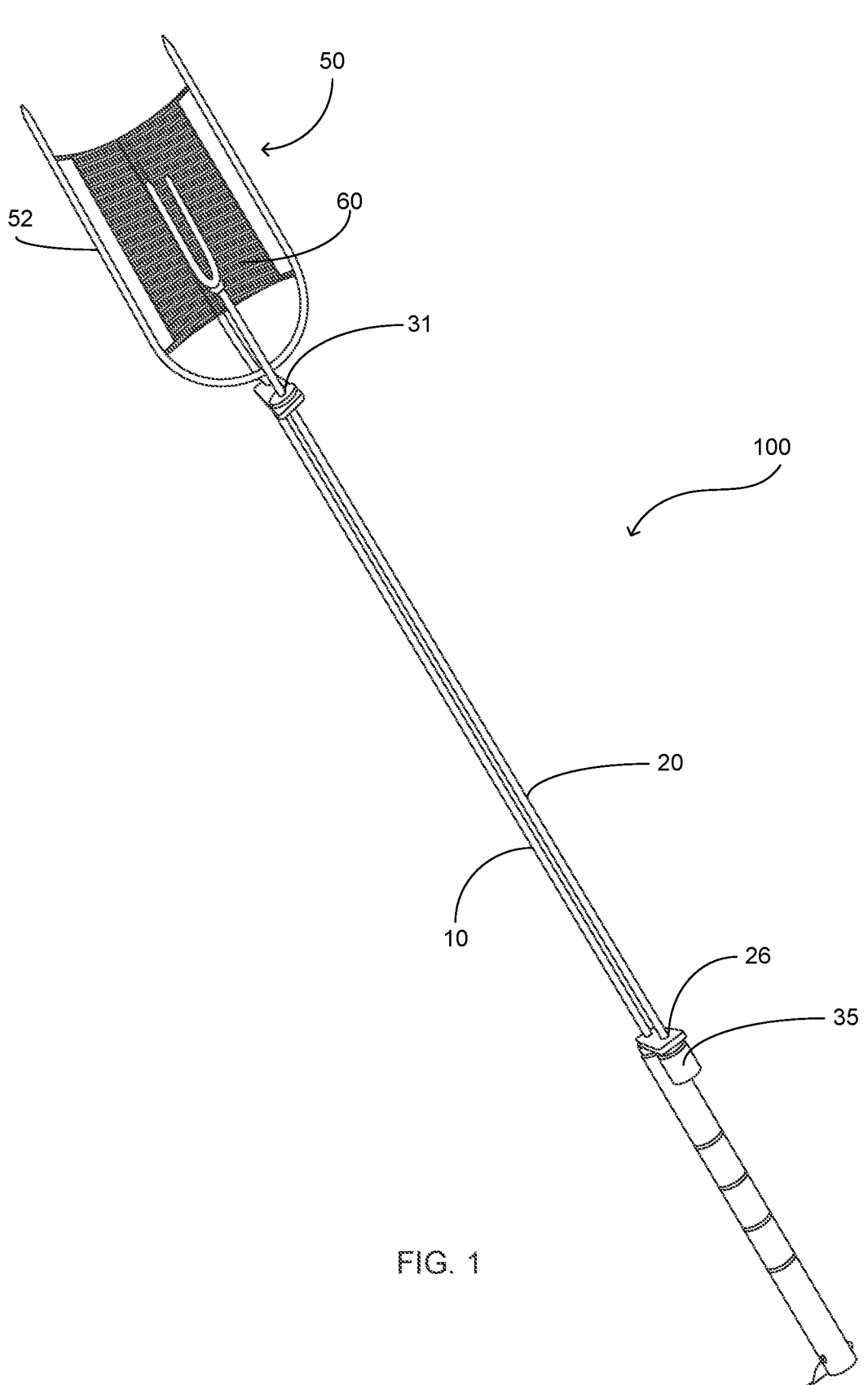
FIG. 1 is a top perspective view of the present invention.

Referring now to the drawings submitted herewith, wherein various elements depicted therein are not necessarily drawn to scale and wherein through the views and figures like elements are referenced with identical reference numerals, there is illustrated a cooking apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted as a part hereof, the cooking apparatus 100 includes a main support member 10. The main support member 10 includes a first end 11 and a second end 12 and is manufactured from a durable rigid material such as but not limited to metal. The main support member 10 in a preferred embodiment is manufactured from a metal rod and it should be understood within the scope of the present invention that the main support member 10 could be provided in various alternate lengths. Operably coupled to the first end 11 of the main support member 10 is handle 15. Handle 15 is secured to the first end 11 of the main support member 10 utilizing suitable durable techniques. In a preferred embodiment the handle 15 is cylindrical and elongated in shape and is manufactured from a heat resistant material. It should be understood within the scope of the present invention that the handle 15 could be manufactured from a plurality of suitable materials and be provided in alternate shapes and sizes.

Rotatably secured to the main support member 10 and axially aligned therewith is the rotational cooking member 20. The rotational cooking member 20 is rod-shaped and includes a first end 21 and a second end 22. The rotational cooking member 20 is adjacent the main support member 10 being mounted thereto employing a first bracket 25 and a second bracket 30. A void 24 is present intermediate the main support member 10 and rotational cooking member 20 as the first bracket 25 and second bracket 30 extend outward from the main support member 10 and the rotational cooking member 20 are operably coupled thereto distal to the main support member 10. The first bracket 25 and second bracket 30 are manufactured from a rigid material such as but not limited to metal and include apertures 26,31 through which the rotational cooking member 20 is mounted and configured to be rotatably movable therein. A knob 35 is secured to the first end 21 of the rotational cooking member 20 proximate the first bracket 25. Knob 35 is manufactured from wood or other suitable material and is employed by the user of the cooking apparatus 100 to provide rotation of the rotational cooking member 20. The cooking apparatus 100 is configured to be utilized with one hand of the user wherein the user engages the handle 15 to hold the cooking apparatus 100 in a desired position and can use the thumb of the hand holding the cooking apparatus 100 to engage knob 35 and facilitate rotational movement of the rotational cooking member 20 with the knob 35.

Proximate the second end 22 of the rotational cooking member 20 are the first prong member 40 and second prong member 45. First prong member 40 and second prong member 45 are contiguously formed with the rotational cooking member 20 and form a U-shape. The first prong member 40 and second prong member 45 have a distance therebetween that facilitates an ability to operably insert both into a single food item to inhibit rotation of the food item thereon. It should be understood that more than two prong members or a single prong member could be formed on the rotational cooking member 20.

Integrally secured to the second end 12 of the main support member 10 is the burn guard member 50. The burn guard member 50 is directly underneath the first prong member 40 and second prong member 45 and is operable to inhibit burning of food items disposed thereon. The burn guard member 50 includes a primary support member 52 that is U-shaped and contiguously formed with the second end 12 of the main support member 10. A secondary support member 54 is further provided and is secured to the second end 12 of the main support member 10. The secondary support member 54 includes first portion 55 and second portion 56 wherein the first portion 55 extends downward from main support member 10 and is arcuate in form resulting in the second portion 56 being parallel with the primary support member 52. The shape of the secondary support member 54 is specifically provided so as to provide proper positioning and support of the screen member 60 relative to the first prong member 40 and second prong member 45. The arrangement of the primary support member 52 and secondary support member 54 results in a formation of the screen member 60 such that the screen member 60 is arcuate in shape. This shape of the screen member 60 results in a void between the first prong member 40 and second prong member 45 that permits rotation of a food item without interference from the screen member 60. The screen member 60 is manufactured from a stainless steel screen mesh material and is operable to diffuse and deflect flames so as to inhibit burning of the food item secured to the first prong member 40 and second prong member 45. It should be understood within the scope of the present invention that the burn guard member 50 could be provided in alternate sizes. Furthermore, it should be understood within the scope of the present invention that while a preferred embodiment of the burn guard member 50 has been illustrated and discussed herein that the burn guard member 50 could be provided with alternate elements, consist of different shapes and achieve the desired objective discussed herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A hand held cooking implement configured to facilitate cooking of a food item over a fire wherein the cooking implement comprises:

a main support member, said main support member being manufactured from a metal rod being elongated in form having a first end and a second end, said main support member having a handle secured to said first end thereof, said main support member having a first bracket operably coupled thereto proximate the first end thereof, said main support member having a second bracket operably coupled thereto proximate the second end thereof, a rotational cooking member, said rotational cooking member being rod shaped having a first end and a second end, said rotational cooking member being operably coupled to said first bracket and said second bracket secured to the main support member, said rotational cooking member having a first prong member and a second prong member integrally formed at the second end of the rotational cooking member, said first end of said rotational cooking member extending beyond said first bracket away from said second bracket, said rotational cooking member being axially aligned with said main support member and having a void therebetween; and a burn guard member, said burn guard member being integrally formed with the second end of the main support member, said burn guard member having a primary support member, said primary support member being U-shaped, said burn guard member having a screen member, said screen member being operably coupled to said primary support member.

2. The hand held cooking implement configured to facilitate cooking of a food item over a fire as recited in claim 1, wherein said burn guard member further includes a secondary support member, said secondary support member being located along a middle axis of said burn guard member and further being axially aligned with said main support member, said secondary support member having a first portion and a second portion.

3. The hand held cooking implement configured to facilitate cooking of a food item over a fire as recited in claim 2, and further including a knob, said knob being operably coupled to said first end of said rotational cooking member, said knob providing an interface to rotate the rotational cooking member.

4. The hand held cooking implement configured to facilitate cooking of a food item over a fire as recited in claim 3, wherein said screen member is a metal screen.

5. The hand held cooking implement configured to facilitate cooking of a food item over a fire as recited in claim 4, wherein said first bracket further includes an aperture and said second bracket further includes an aperture wherein said rotational cooking member is journaled through the aperture of the first bracket and the aperture of the second bracket being movable therein.

6. The hand held cooking implement configured to facilitate cooking of a food item over a fire as recited in claim 5, wherein said first portion of said secondary support member is arcuate in shape and said second portion being contiguously formed with said first portion being parallel to said primary support member of said burn guard member.

* * * * *